United States Patent
Nitz et al.

(10) Patent No.: US 8,872,468 B2
(45) Date of Patent: Oct. 28, 2014

(54) METHOD AND DEVICE FOR OPERATING AN ASYNCHRONOUS MOTOR WITH INCREASED EFFICIENCY

(75) Inventors: Bernd Nitz, London (GB); Norbert Rudiger Klaes, Schoneiche (DE)

(73) Assignee: MK Regeltechnik AG, Magdeburg (DE)

( * ) Notice: Subject to any disclaimer, the term of this patent is extended or adjusted under 35 U.S.C. 154(b) by 125 days.

(21) Appl. No.: 13/521,795

(22) PCT Filed: Jan. 12, 2010

(86) PCT No.: PCT/EP2010/050281
§ 371 (c)(1),
(2), (4) Date: Oct. 1, 2012

(87) PCT Pub. No.: WO2011/085805
PCT Pub. Date: Jul. 21, 2011

(65) Prior Publication Data
US 2013/0009590 A1 Jan. 10, 2013

(51) Int. Cl.
*H02P 27/06* (2006.01)
*H02P 27/08* (2006.01)

(52) U.S. Cl.
USPC ............. 318/798; 318/400.13; 318/400.26; 318/800; 318/811

(58) Field of Classification Search
USPC ............. 318/400.13, 400.26, 800–811, 798
See application file for complete search history.

(56) References Cited

U.S. PATENT DOCUMENTS

| 3,568,022 A | * | 3/1971 | Domann et al. | 318/800 |
| 3,593,083 A | * | 7/1971 | Blaschke | 318/803 |
| 3,731,169 A | * | 5/1973 | Burgholte et al. | 318/801 |

(Continued)

FOREIGN PATENT DOCUMENTS

| DE | 19642388 A | 4/1998 |
| DE | 10061293 A1 | 7/2001 |

(Continued)

OTHER PUBLICATIONS

"Soft-Started Induction Motor Modeling and Heating Issues for Different Starting Profiles Using a Flux Linkage ABC Frame of Reference"; Solveson et al., IEEE Transactions on Industry Applications, vol. 42, No. 4, Jul./Aug. 2006, 2006 IEEE, 10 pages.

(Continued)

*Primary Examiner* — Paul Ip
(74) *Attorney, Agent, or Firm* — Westman, Champlin & Koehler, P.A.

(57) ABSTRACT

Method and device for operating an asynchronous motor having increased efficiency. According to the invention, ranges for a motor size of the asynchronous motor are specified. In addition, a value of the motor size is calculated depending on at least one measurement value of a measurement parameter during the operation of the asynchronous motor, wherein the respective calculated value of the motor size is allocated to one of the ranges. Furthermore, a control parameter is changed depending on the range to which the calculated motor parameter is allocated to provide an optimised control parameter such that the control parameter is changed beginning from a starting value specified for the respective range of the motor size until a predetermined criterion for a specific motor size is reached. Furthermore, the optimised control parameter is stored as a support point of a continuous optimal characteristic curve for the control parameter depending on the range to which the calculated motor size is allocated.

20 Claims, 6 Drawing Sheets

(56) References Cited

U.S. PATENT DOCUMENTS

| | | | | |
|---|---|---|---|---|
| 4,263,542 A * | 4/1981 | Schulze et al. | | 318/803 |
| 4,338,559 A * | 7/1982 | Blaschke et al. | | 318/805 |
| 4,442,394 A * | 4/1984 | Beierholm et al. | | 318/807 |
| 4,484,126 A * | 11/1984 | Fulton et al. | | 318/800 |
| 4,484,128 A * | 11/1984 | Jotten et al. | | 318/805 |
| 4,833,388 A * | 5/1989 | Dorner | | 318/800 |
| 4,841,218 A * | 6/1989 | Rosinnes et al. | | 322/24 |
| 5,010,288 A * | 4/1991 | Poline | | 318/811 |
| 5,086,264 A * | 2/1992 | Kelledes et al. | | 318/798 |
| 5,140,248 A * | 8/1992 | Rowan et al. | | 318/811 |
| 5,194,797 A * | 3/1993 | Kahkipuro | | 318/727 |
| 5,212,438 A * | 5/1993 | Miyazaki et al. | | 318/805 |
| 5,477,121 A * | 12/1995 | Sirjola | | 318/799 |
| 5,548,199 A * | 8/1996 | Bidaud et al. | | 318/802 |
| 5,719,482 A * | 2/1998 | Kunzel | | 318/800 |
| 5,767,652 A * | 6/1998 | Bidaud et al. | | 318/802 |
| 5,969,498 A * | 10/1999 | Cooke | | 318/799 |
| 5,994,867 A * | 11/1999 | Birk et al. | | 318/609 |
| 5,998,959 A * | 12/1999 | Eisenhardt | | 318/802 |
| 6,020,714 A * | 2/2000 | Ehrler et al. | | 318/807 |
| 7,495,408 B2 * | 2/2009 | Aleyt et al. | | 318/609 |
| 8,232,760 B2 * | 7/2012 | Lu et al. | | 318/807 |
| 8,250,864 B2 * | 8/2012 | Pott et al. | | 60/601 |
| 8,519,651 B2 * | 8/2013 | Hernandez Ferrusca et al. | | 318/400.13 |
| 2005/0253550 A1 * | 11/2005 | Matsuo et al. | | 318/807 |
| 2006/0050758 A1 | 3/2006 | Sedighy et al. | | |
| 2007/0018603 A1 * | 1/2007 | Aleyt et al. | | 318/609 |
| 2007/0278021 A1 * | 12/2007 | Pott et al. | | 180/65.2 |
| 2010/0079104 A1 * | 4/2010 | Becker et al. | | 318/802 |
| 2010/0315034 A1 * | 12/2010 | Lu et al. | | 318/802 |
| 2011/0043149 A1 * | 2/2011 | Kitanaka | | 318/400.26 |
| 2012/0081065 A1 * | 4/2012 | Krafka et al. | | 318/798 |
| 2012/0086383 A1 * | 4/2012 | Hernandez Ferrusca et al. | | 318/759 |
| 2012/0262103 A1 * | 10/2012 | Ek et al. | | 318/778 |
| 2012/0280645 A1 * | 11/2012 | Olsson et al. | | 318/802 |

FOREIGN PATENT DOCUMENTS

| | | |
|---|---|---|
| DE | 10009861 A1 | 9/2001 |
| DE | 10062940 A1 | 6/2002 |
| DE | 102005036802 B3 | 4/2007 |
| DE | 102008018625 A1 | 10/2009 |
| EP | 0989666 A1 | 3/2000 |

OTHER PUBLICATIONS

International Search Report for PCT Application No. PCT/EP2010/050281, dated Oct. 1, 2010, 6 pages.

* cited by examiner

METHOD AND DEVICE FOR OPERATING AN ASYNCHRONOUS MOTOR WITH INCREASED EFFICIENCY

FIELD OF THE INVENTION

The invention relates to a method and device for operating an asynchronous motor with increased efficiency.

BACKGROUND OF THE INVENTION

Publication DE 100 61 293 A1 shows a method and a device for improving the efficiency of an asynchronous motor. In this case, three-phase power is supplied in order to activate the motor. A direct voltage and a direct current are measured and used to determine an estimated active power. Conclusions regarding the loading of the asynchronous motor can be drawn from the estimated active power.

An estimated torque-producing current value is also determined and compared with the actual torque-producing current value. In addition, the difference between the actual and the estimated torque-producing current value is determined. The estimated active power is changed on the basis of this determined difference. The three-phase power supplied to the asynchronous motor can be changed on this basis.

A method and a device for increasing the efficiency of an electric motor are also known from publication DE 10 2005 036 802 B3.

Another conventional device for operating a three-phase asynchronous motor is described in publication DE 10 2008 018 625 A1.

An example of a three-phase current controller is also shown in "Soft-Started Induction Motor Modeling and Heating issues for Different Starting Profiles Using a Flux Linkage ABC Frame of Reference", Mark G. Solveson, Behrooz Mirafzal, and Nabeel A. O. Demerdash, in IEEE TRANSACTIONS ON INDUSTRY APPLICATIONS, VOL. 42, NO. 4, JULY/AUGUST 2006.

SUMMARY OF THE INVENTION

An object of the present invention is to operate an asynchronous motor more effectively.

According to the invention, this object is achieved by a method having the features of claim 1 and/or by a device having the features of claim 15.

A method for operating an asynchronous motor with increased efficiency is accordingly proposed, which method has the following steps.

In a first step, ranges for a motor variable of the asynchronous motor are set. In a second step, a value of the motor variable is calculated on the basis of at least one measured value of a measured variable during operation of the asynchronous motor, the respective calculated value of the motor variable being associated with one of the ranges. Further, in a third step, a control variable is changed on the basis of the range associated with the calculated motor variable in order to provide an optimised control variable, such that the control variable is changed, starting from a start value set for the respective range of the motor variable, until a predetermined criterion for a specific motor variable is reached. In a fourth step, the optimised control variable is stored as a data point of a continuous optimal characteristic curve for the control variable on the basis of the range associated with the calculated motor variable.

A computer program product is also proposed which, on a program-controlled apparatus, causes a method according to the invention as described above to be carried out.

A computer program product such as a computer program means can for example be provided or supplied as a storage medium, such as a memory card, USB stick, floppy disc, CD stick, CD-ROM, DVD, or in the form of a downloadable file by a server in a network. This can take place for example in a wireless communication network by transferring a corresponding file using the computer program product or the computer program means.

A device for operating an asynchronous motor with increased efficiency is also proposed. The device has a first means for setting ranges for a motor variable of the asynchronous motor. In addition, the device comprises a second means for calculating a value of the motor variable on the basis of at least one measured value of a measured variable during operation of the asynchronous motor, the respective value of the motor variable being associated with one of the ranges. The device also has a third means for changing a control variable on the basis of the range associated with the calculated motor variable in order to provide an optimised control variable. The third means changes the control variable such that the control variable is changed, starting from a start value set for the respective range of the motor variable, until a predetermined criterion for a specific motor variable is reached. In addition, the device has a fourth means for storing the optimised control variable as a data point of a continuous optimal characteristic curve for the control variable on the basis of the range associated with the calculated motor variable.

In addition, a three-phase current controller for actuating an asynchronous motor is proposed which comprises a device as described above for operating the asynchronous motor with increased efficiency.

An advantage of the present invention is that the asynchronous motor can be operated more effectively by providing and using the continuous optimal characteristic curve.

Adaptive optimisation of the operating point of the asynchronous machine or the asynchronous motor is possible by means of the optimal characteristic curve.

Overall, applying the method according to the invention produces a sufficiently optimised characteristic curve after only a few load cycles. An advantage of using the optimal characteristic curve produced according to the invention is that, after completion of the optimisation phase, continuous adjustment with corresponding recovery times is not necessary. Instead, the optimisation is reduced to a single adjustment process according to the determined optimal characteristic curve. Thus, the optimum motor voltage of the asynchronous motor is determined quickly and accurately. A further advantage is that adjustment oscillations can be avoided.

The specific motor variable of the asynchronous motor, for which variable a specific criterion, for example a threshold value, is to be reached, can be the same motor variable for which the ranges are set. Alternatively, these can also be different motor variables of the asynchronous motor, for example the active power and the reactive power. For example, ranges can be set for the active power and a value of the active power can be calculated for example on the basis of the motor voltage. A control variable, for example the control angle, is also changed on the basis of the range associated with the calculated active power, such that the control angle is changed, starting from a start value set for the respective range of the active power, until a predetermined criterion for the reactive power is reached.

Further possible motor variables are a power factor, a motor current or predetermined angle variables.

Advantageous configurations and embodiments of the invention emerge from the dependent claims and the description with reference to the drawings.

According to a preferred embodiment, the data point is extrapolated to at least a range adjacent to the range of the calculated value of the motor variable. As a result, at least one extrapolated point of the optimal characteristic curve is provided. In addition, the respective extrapolated point is set as a start value for the respective adjacent range.

According to another preferred embodiment, the second to fourth steps are carried out until each of the ranges has been optimised exactly once.

According to another preferred embodiment, the motor variable is the active power recorded during operation of the asynchronous motor.

According to another preferred embodiment, a plurality of ranges is set for the active power recorded during operation of the asynchronous motor. A respective value of the active power is then calculated on the basis of a respective measured value of the motor current and/or on the basis of a respective measured value of the motor voltage during operation of the asynchronous motor. The respective value of the active power is associated with one of the ranges.

The provided ranges preferably overlap. Owing to the use of overlapping ranges, a potentially continuous oscillation between adjacent intervals is advantageously suppressed.

The control variable is preferably a control angle, an off-period or a cut-off angle. The control angle $\alpha$ or ignition delay angle $\alpha$ is defined as the angle between the zero crossing of the motor voltage and the start of the motor current flow. The cut-off angle $\gamma$ is defined as the angle between the quenching and the restarting of the motor current flow. The off-period, in particular the off-period of the thyristor of the three-phase current controller, is defined as the duration corresponding to the cut-off angle $\gamma$. The off-period corresponds to the length of the current gap. The current gap is the duration for which no motor current flows. The off-state of the thyristor is preferably determined and evaluated by detection of the off-state voltage.

In particular, by means of the device according to the invention or by means of the three-phase current controller comprising the device according to the invention, the motor voltage of the asynchronous motor is reduced such that the defined optimal criterion can be reached by the optimal characteristic curve provided according to the invention. The optimal criterion can relate for example to the recorded active power of the asynchronous motor and thus to the energy consumption of the asynchronous motor. As described above, there is also the option of additionally evaluating the recorded reactive power, the motor current or variables derived therefrom for an optimal criterion. Since the motor variable to be optimised is itself heavily dependent on the operating point, according to the invention the motor variable to be optimised is not adjusted directly, rather according to the invention the optimal characteristic curve for the control variable or correcting variable of the three-phase current controller is used on the basis of a further motor variable. This further motor variable is for example the recorded active power as a feature of the load state of the asynchronous motor.

According to another preferred embodiment, an initial characteristic curve is provided, which in each case comprises a set start value for the respective range of the motor variable. The respective start value reduces the complexity, in particular the time expenditure, of providing the optimised control variable.

According to another preferred embodiment, the third and fourth steps are started when the motor variable observed according to the second step is stable.

According to another preferred embodiment, the motor variable observed according to the fourth step is defined as stable if changes in the observed motor variable over time are within a specific threshold value window. The threshold value window is in particular determined in advance.

The optimisation of each range or interval of the optimal characteristic curve is started when the observed motor variable can be considered stable by evaluating the changes over time. In this case, the control variable or correcting variable of the three-phase current controller is changed. The effects on the motor variable to be optimised are observed. If the effects and thus the changes were advantageous, the correcting variable is adopted in the optimal characteristic curve at least temporarily and potentially changed further during the continuation of the optimisation until the optimal criterion is reached or exceeded. The value thus determined of the control variable is stored as an optimised value or data point in the optimal characteristic curve. The optimisation of a range is interrupted if the motor variable which defines the range has changed by more than a predetermined threshold value.

According to another preferred embodiment, the data point is extrapolated on the basis of predetermined monotonous behaviour of the asynchronous motor.

According to another preferred embodiment, after each process of storing a data point, the stored data point is extrapolated to at least a range adjacent to the range of the calculated value of the motor variable on the basis of the predetermined monotonous behaviour.

With knowledge of the monotonous behaviour of the asynchronous motor, the control variable of adjacent ranges can advantageously be deduced after each improvement or change in the optimal characteristic curve by means of temporarily or definitively optimised values (data points).

According to another preferred embodiment, upon detection of a load step the control variable is changed in a departure from the continuous optimal characteristic curve such that the motor voltage increases to prevent failure of the asynchronous motor.

In particular when the asynchronous motor is under low load, the optimisation can lead to a considerable reduction in the motor voltage. This reduction in the motor voltage can be so strong that the asynchronous motor could fail, that is to say the rotational speed thereof could fall sharply, in the case of a rapid load step. To prevent failure of the asynchronous motor, upon detection of a load step the control variable or correcting variable is changed in a departure from the optimal characteristic curve for a short time such that the motor voltage increases rapidly, in order thus to prevent failure of the asynchronous motor. An example of a method for detecting a load step is described in publication EP 0 113 503 A. In this case, the off-state voltage of the thyristors is evaluated to detect the load step. If the off-state voltage or a variable derived therefrom, for example the sum of the values of the three off-state voltages of the three phases, exceeds a threshold value, then the load step is detected. The off-state voltage of the thyristors can be detected separately. Alternatively, the off-state voltage of the thyristors can also be calculated from the supply voltage and the motor voltage.

After the change to prevent failure of the asynchronous motor, the control variable is preferably returned continuously to the characteristic curve value of the optimal characteristic curve of the associated range. This return takes place on the basis of a temporal control or on the basis of a signal for detection of the load step.

In applications with rapidly recurring changes to the motor variable which determines the control variable, the optimisation may be interrupted correspondingly frequently, without it being possible to determine the optimal characteristic curve sufficiently accurately. For applications of this type, the characteristic curve is preferably estimated from experimental values and/or from calculations to ensure reliable operation of the motor. This estimation can be made during operation of the asynchronous motor or while the asynchronous motor is not being operated. For this reason, improvement of the motor behaviour is advantageously possible even for applications of this type with frequently varying operating points.

BRIEF DESCRIPTION OF THE DRAWINGS

The invention will be described in greater detail below with reference to the embodiments shown in the schematic figures, in which.

In all the figures, like or functionally like means and apparatuses are provided with the same reference signs, unless stated otherwise.

DETAILED DESCRIPTION OF THE INVENTION

Figure 1:
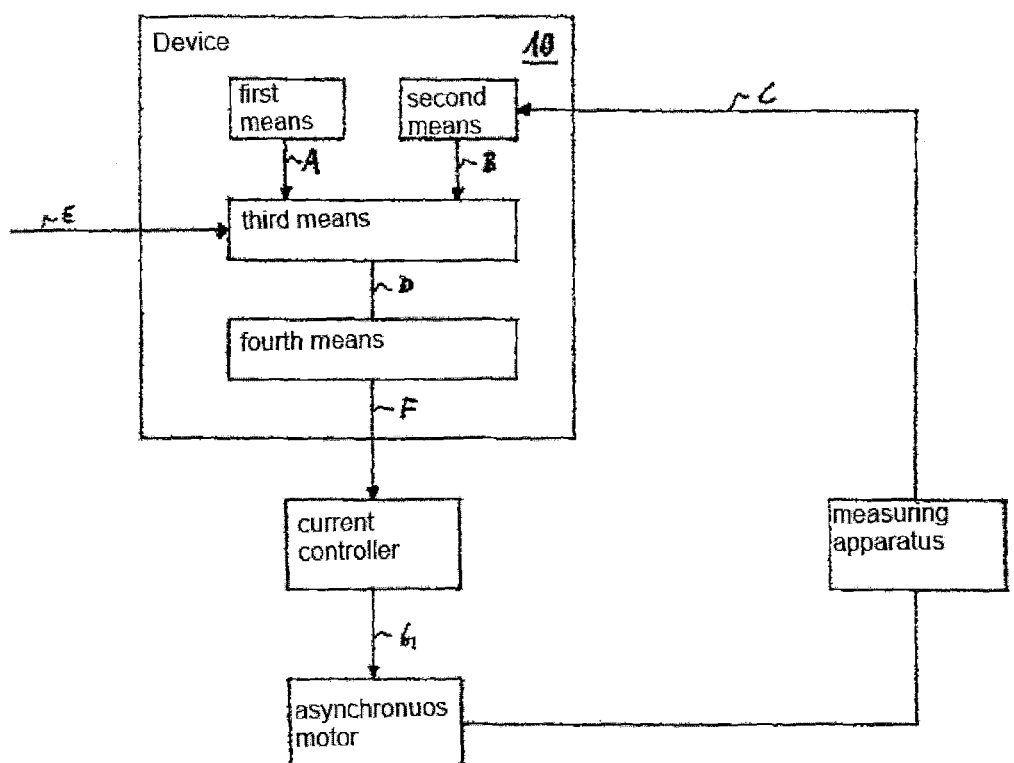
FIG. 1 is a schematic block diagram of an embodiment of the device according to the invention for operating an asynchronous motor with increased efficiency.

FIG. 1 is a schematic block diagram of an embodiment of the device 10 according to the invention for operating an asynchronous motor 20 with increased efficiency.

Figure 2:
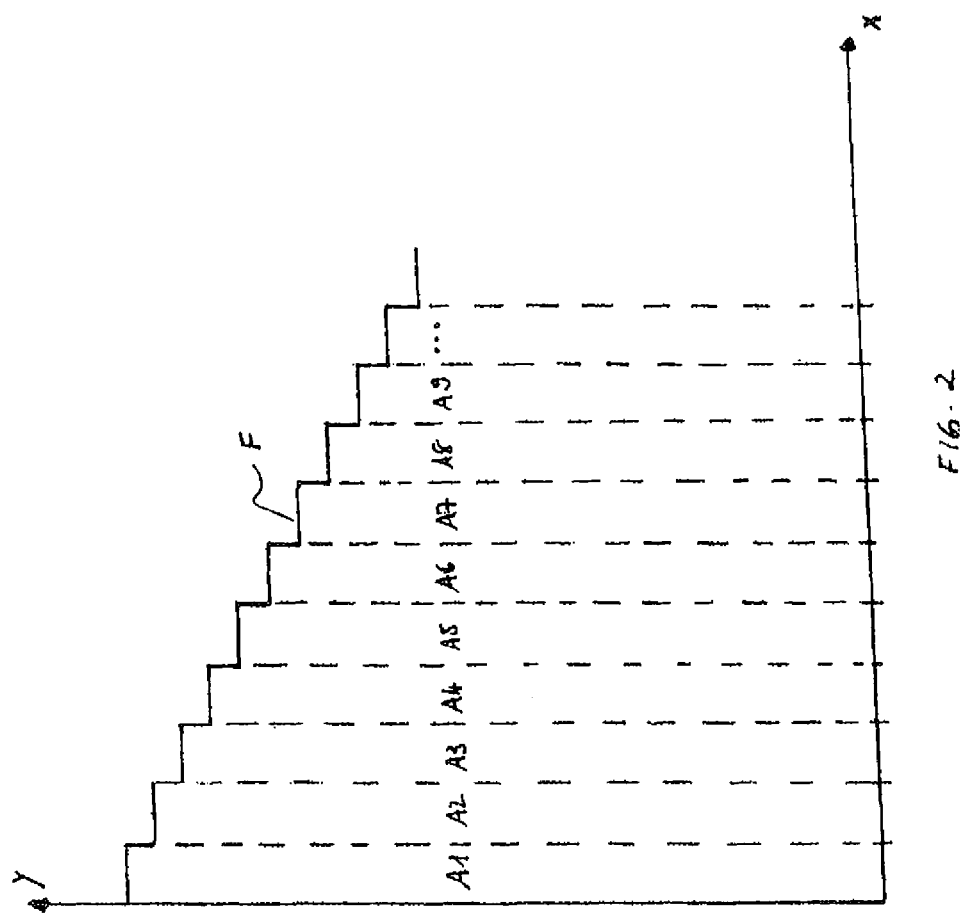
FIG. 2 is a schematic diagram showing the continuous optimal characteristic curve according to the invention.

The device 10 has a first means 11, a second means 12, a third means 13 and a fourth means 14. The first means 11 is designed to set ranges A, A1-A9 for a motor variable of the asynchronous motor 20. In this regard, the x axis in FIG. 2 shows a motor variable of the asynchronous motor 20 and various ranges A1 to A9.

The second means 12 is designed to calculate a value B of the motor variable on the basis of at least one measured value C of a measured variable during operation of the asynchronous motor 20. The respective calculated value B of the motor variable is associated with one of the ranges A, A1-A9. To provide the measured value C, a measuring apparatus 40 is provided and is coupled between the asynchronous motor 20 and the device 10.

The third means 13 of the device 10 is designed to change a control variable on the basis of the range A associated with the calculated motor variable, in order to provide an optimised control variable D. This change is carried out such that the control variable is changed, starting from a start value E set for the respective range A of the motor variable, until a predetermined criterion for a specific motor variable is reached. The third means 13 is therefore designed to receive a set start value E of this type.

The fourth means 14 is designed to store the optimised control variable D as a data point of a continuous optimal characteristic curve F for the control variable on the basis of the range A, A1-A9 associated with the calculated motor variable. The provided continuous optimal characteristic curve F is provided to the three-phase current controller 30.

The three-phase current controller 30 is designed to produce an actuating signal G to actuate the asynchronous motor 20 on the basis of the continuous optimal characteristic curve F.

In this regard, FIG. 2 is a schematic diagram showing the continuous optimal characteristic curve F according to the invention.

As set out above, the x axis in FIG. 2 denotes the motor variable, whereas the y axis shows the control variable. The x axis and thus the motor variable are divided into various ranges A1-A9. The optimal characteristic curve F according to the invention for the control variable is continuous.

Figure 3:
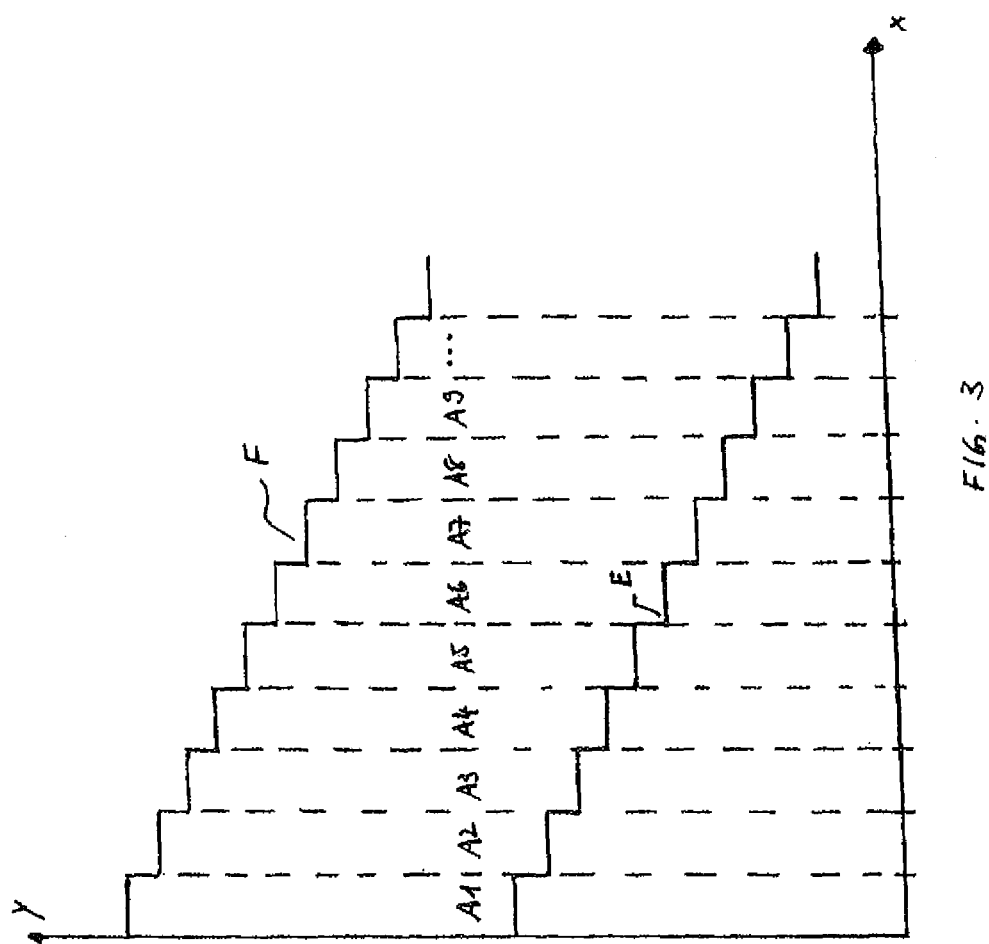
FIG. 3 is a schematic diagram showing the continuous optimal characteristic curve according to the invention and an initial characteristic curve.

In particular, an initial characteristic curve E can be used, which in each case comprises a start value for the respective range A1-A9 of the motor variable. The use of an initial characteristic curve of this type reduces the time required to produce the optimal characteristic curve F. In this regard, FIG. 3 is a schematic diagram showing the continuous optimal characteristic curve F according to the invention and the initial characteristic curve E. As in FIG. 2, the x axis denotes the motor variable and the y axis denotes the control variable.

Figure 4:
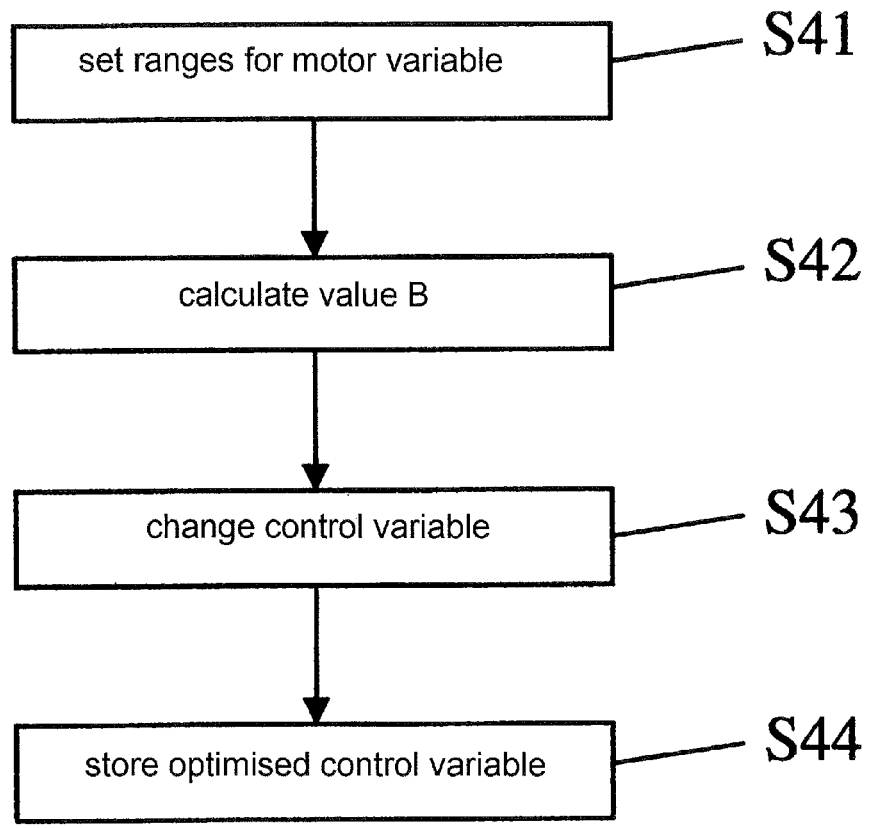
FIG. 4 is a schematic flow diagram of a first embodiment of the method according to the invention for operating an asynchronous motor with increased efficiency.

FIG. 4 is a schematic flow diagram of a first embodiment of the method according to the invention for operating an asynchronous motor 20 with increased efficiency.

The first embodiment in FIG. 4 has the following steps S41 to S44 and will be described with reference to FIG. 1.

Step S41:
Ranges A, A1-A9 are set for a motor variable of the asynchronous motor 20.

Step S42:
A value B of the motor variable is calculated on the basis of at least one measured value C of a measured variable during operation of the asynchronous motor 20. The respective calculated value B of the motor variable is associated with one of the ranges A, A1-A9. For example, a plurality of ranges A1-A9 (see FIGS. 2 and 3) is set for an active power recorded during operation of the asynchronous motor 20. The active power recorded during operation is accordingly a suitable example of the motor variable. A respective value B of the active power is then calculated on the basis of a respective measured value C of the motor current I (see FIG. 6) and/or on the basis of a respective measured value C of the motor voltage U during operation of the asynchronous motor 20. The respective calculated value B of the active power is accordingly associated with one of the ranges A1-A9.

Step S43:
A control variable is changed on the basis of the range A, A1-A9 associated with the calculated motor variable B in order to provide an optimised control variable D, such that the control variable is changed, starting from a start value F set for the respective range A of the motor variable, until a predetermined criterion for a specific motor variable is reached.

An initial characteristic curve E is preferably used to provide the set start value for the respective ranges A1-A9 of the motor variable (see FIG. 3).

Figure 6:
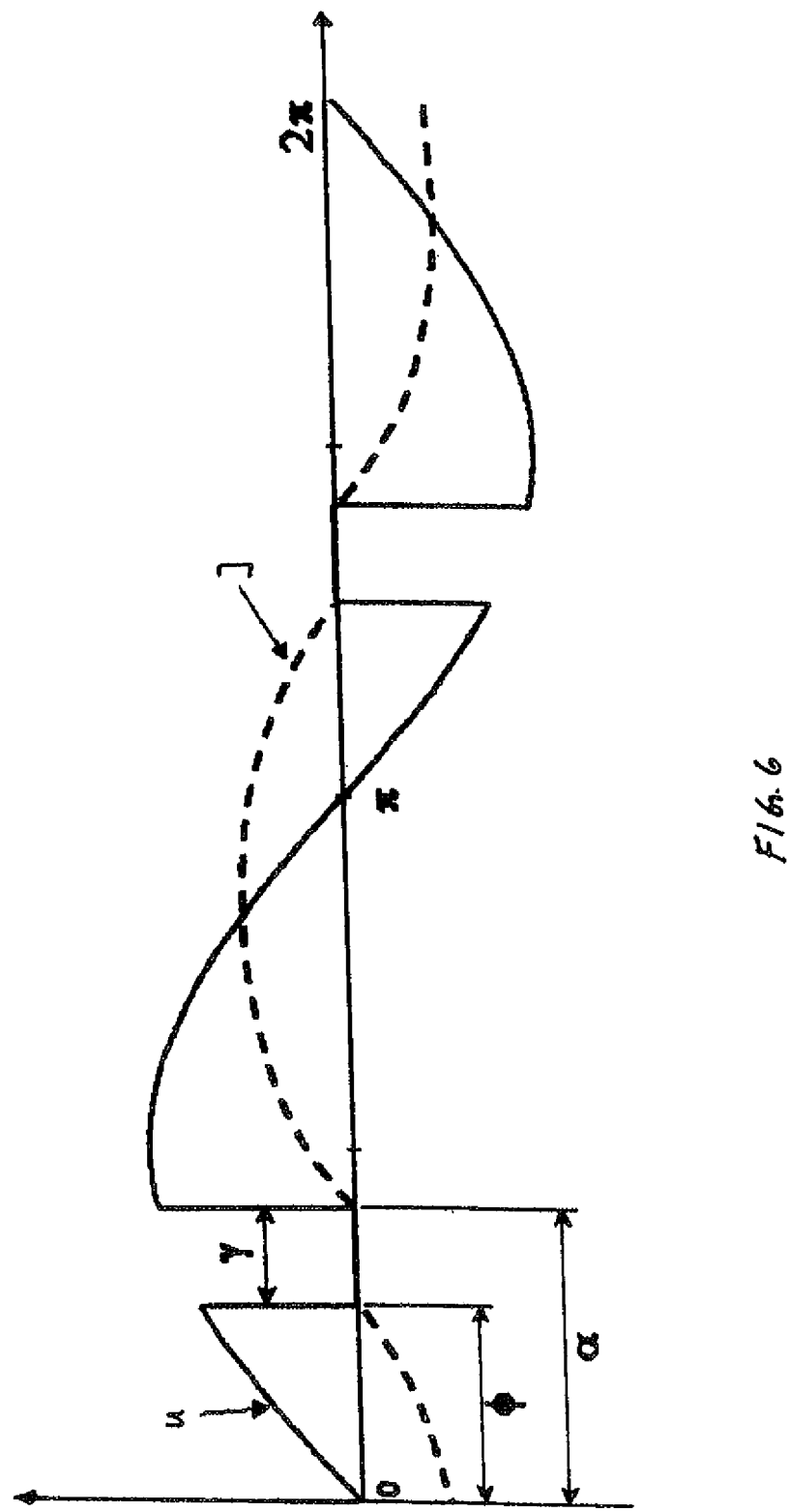
FIG. 6 is a schematic diagram showing the angle-dependent motor voltage and the angle-dependent motor current of an asynchronous motor.

The control variable is for example in the form of a control angle α, a cut-off angle γ or an off-period. In this regard, FIG. 6 is a schematic diagram showing the angle-dependent motor voltage U and the angle-dependent motor current I of an asynchronous motor 20. In this case, FIG. 6 also shows the control angle α, which is defined as the angle between the zero crossing of the motor voltage U and the start of flow of the motor current I. FIG. 6 also shows the cut-off angle γ, which is defined as the angle between the quenching and the restarting of the flow of the motor current I.

Step S44:

The optimised control variable D is stored as a data point of a continuous optimal characteristic curve F for the control variable on the basis of the range A, A1-A9 associated with the calculated motor variable B.

Steps S42 to S44 are preferably carried out until each of the ranges A1-A9 has been optimised exactly once.

In addition, steps S43 and S44 are preferably started when the motor variable observed according to step S42 is stable. In particular, the observed motor variable is defined as stable if changes in the observed motor variable over time are within a specific threshold value window. This threshold value window is in particular determined or set in advance.

In addition, upon detection of a load step the control variable is changed in a departure from the continuous optimal characteristic curve F such that the motor voltage U increases to prevent failure of the asynchronous motor 20. After the change to prevent failure of the asynchronous motor 20, the control variable is returned continuously to the characteristic curve value of the optimal characteristic curve F of the associated range A1-A9.

Figure 5:
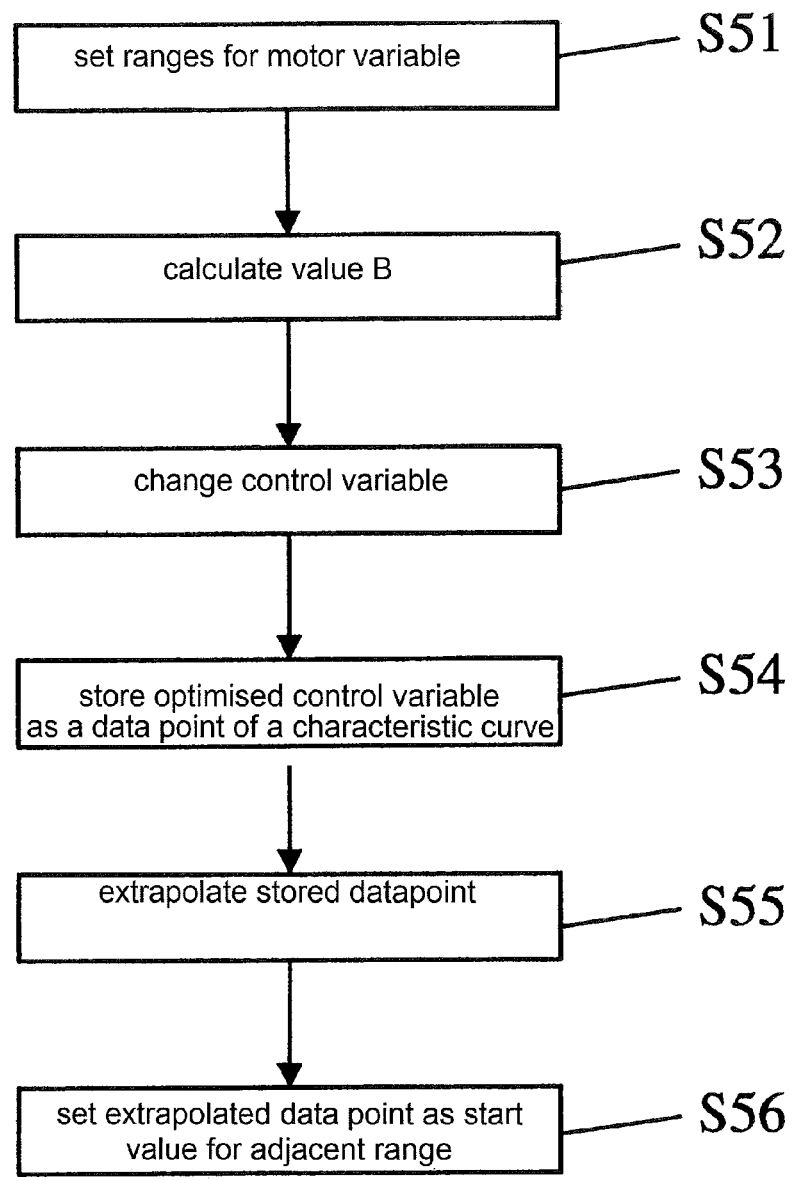
FIG. 5 is a schematic flow diagram of a second embodiment of the method according to the invention for operating an asynchronous motor with increased efficiency.

Further, FIG. 5 is a schematic flow diagram of a second embodiment of the method according to the invention for operating an asynchronous motor 20 with increased efficiency.

Steps S51 to S54 in FIG. 5 correspond to steps S41 to S44 in FIG. 4 and thus will not be described again.

The second embodiment in FIG. 5 thus differs from the first embodiment in FIG. 4 by the additional steps S55 and S56.

Step S55:

The data point stored according to step S44 or S54 is extrapolated at least to a range, for example range A2, which is adjacent to the range, for example range A1, of the calculated value B of the motor variable, in order to provide at least one extrapolated point of the optimal characteristic curve F. This extrapolation of the data point is preferably carried out on the basis of predetermined monotonous behaviour of the asynchronous motor 20.

Step S56:

The respective extrapolated data point is set as a start value for the respective adjacent range, for example the range A2.

Preferably, after each process of storing a data point according to step S54, the stored data point is extrapolated to at least a range A2 adjacent to the range A1 of the calculated value B of the motor variable on the basis of the predetermined monotonous behaviour of the asynchronous motor 20.

Although the present invention has been described above with reference to the preferred embodiments, it is not limited thereto but rather can be modified in a variety of ways.

LIST OF REFERENCE SIGNS 10 device
11 first means
12 second means
13 third means
14 fourth means
20 asynchronous motor or asynchronous machine
30 three-phase current controller
40 measuring apparatus
A; A1-A9 set range for a motor variable
B calculated value of the motor variable
C measured value of a measured variable
D optimised control variable
E start value or initial characteristic curve
F optimal characteristic curve
G actuating signal
U motor voltage
motor current
α control angle
γ cut-off angle

The invention claimed is:

1. A method for operating an asynchronous motor with increased efficiency, comprising the following steps:
   a) setting ranges for a motor variable of the asynchronous motor,
   b) calculating a value of the motor variable on the basis of at least one measured value of a measured variable during operation of the asynchronous motor, the respective value of the motor variable being associated with one of the ranges,
   c) changing a control variable on the basis of the range associated with the calculated motor variable in order to provide an optimised control variable, such that the control variable is changed, starting from a start value set for the respective range of the motor variable, until a predetermined criterion for a specific motor variable is reached, and
   d) storing the optimised control variable as a data point of a continuous optimal characteristic curve for the control variable on the basis of the range associated with the calculated motor variable.

2. The method according to claim 1,
wherein the method further comprises the following steps:
   e) extrapolating the data point to at least a range adjacent to the range of the calculated value of the motor variable in order to provide at least one extrapolated point of the optimal characteristic curve, and
   f) setting the respective extrapolated data point as a start value for the respective adjacent range.

3. The method according to claim 1,
wherein steps b) to d) are carried out until each of the ranges has been optimised exactly once.

4. The method according to claim 2,
wherein steps b) to f) are carried out until each of the ranges has been optimised exactly once.

5. The method according to claim 1,
wherein a plurality of ranges is set for an active power recorded during operation of the asynchronous motor, a respective value of the active power being calculated on the basis of a respective measured value of the motor current and/or on the basis of a respective measured value of the motor voltage during operation of the asynchronous motor, the respective value of the active power being associated with one of the ranges.

6. The method according to claim 1,
wherein the control variable is a control angle (α), an off-period or a cut-off angle.

7. The method according to claim 1,
wherein an initial characteristic curve is provided, which in each case comprises a set start value for the respective range of the motor variable.

8. The method according to claim 1,
wherein steps c) and d) are started when the motor variable observed according to step b) is stable.

9. The method according to claim 8,
wherein the motor variable observed according to step b) is defined as stable if changes in the observed motor variable over time are within a specific threshold value window.

10. The method according to any of claim 2,
wherein the data point is extrapolated on the basis of predetermined monotonous behaviour of the asynchronous motor.

11. The method according to claim 10,
wherein, after each process of storing a data point according to step d), the stored data point is extrapolated to at least a range adjacent to the range of the calculated value of the motor variable on the basis of the predetermined monotonous behaviour.

12. The method according to claim 1,
wherein, upon detection of a load step, the control variable is changed in a departure from the continuous optimal characteristic curve such that the motor voltage increases to prevent failure of the asynchronous motor.

13. The method according to claim 12,
wherein, after the change to prevent failure of the asynchronous motor, the control variable is returned continuously to the characteristic curve value of the optimal characteristic curve of the associated range.

14. The method of claim 1, wherein:
the motor variable is an active power of the asynchronous motor;
step a) comprises setting ranges for the active power;
the measured value is a voltage of the motor; and
step b) comprises calculating a value of the active power based on a voltage of the motor.

15. The method of claim 14, wherein:
the control variable is a control angle for the motor, which is the angle between a zero crossing of the motor voltage and the start of the motor current flow; and
step c) comprises changing the control angle on the basis of the range associated with the calculated value of the active power, such that the control angle is changed, starting from a start value set for the respective range of the active power, until a predetermined criterion for a specific motor variable is reached.

16. The method of claim 14, wherein the
the control variable is a cut-off angle for the motor, which is the angle between a quenching and a restarting of a current flow in the motor; and
step c) comprises changing the cut-off angle on the basis of the range associated with the calculated value of the active power.

17. The method of claim 14, wherein the
the control variable is an off-period of a thyristor of a three-phase current controller; and
step c) comprises changing the off-period on the basis of the range associated with the calculated value of the active power.

18. The method of claim 14, wherein the specific motor variable is a reactive power of the motor.

19. A computer program product which, on a program-controlled apparatus, causes a method comprising the following steps to be carried out:
a) setting ranges for a motor variable of the asynchronous motor,
b) calculating a value of the motor variable on the basis of at least one measured value of a measured variable during operation of the asynchronous motor, the respective value of the motor variable being associated with one of the ranges,
c) changing a control variable on the basis of the range associated with the calculated motor variable in order to provide an optimised control variable, such that the control variable is changed, starting from a start value set for the respective range of the motor variable, until a predetermined criterion for a specific motor variable is reached, and
d) storing the optimised control variable as a data point of a continuous optimal characteristic curve for the control variable on the basis of the range associated with the calculated motor variable.

20. A device for operating an asynchronous motor with increased efficiency, comprising:
a first means for setting ranges for a motor variable of the asynchronous motor,
a second means for calculating a value of the motor variable on the basis of at least one measured value of a measured variable during operation of the asynchronous motor, the respective value of the motor variable being associated with one of the ranges,
a third means for changing a control variable on the basis of the range associated with the calculated motor variable in order to provide an optimised control variable, such that the control variable is changed, starting from a start value set for the respective range of the motor variable, until a predetermined criterion for a specific motor variable is reached, and
a fourth means for storing the optimised control variable as a data point of a continuous optimal characteristic curve for the control variable on the basis of the range associated with the calculated motor variable.

* * * * *